US006987330B2

(12) United States Patent
Momcilovich et al.

(10) Patent No.: US 6,987,330 B2
(45) Date of Patent: Jan. 17, 2006

(54) METHOD AND SYSTEM FOR CONTROLLING A BELT-DRIVEN INTEGRATED STARTER GENERATOR

(75) Inventors: Paul Theodore Momcilovich, Carleton, MI (US); Michael W. Degner, Novi, MI (US); Henry Heping Huang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 10/249,519

(22) Filed: Apr. 16, 2003

(65) Prior Publication Data

US 2004/0206325 A1    Oct. 21, 2004

(51) Int. Cl.
*H02P 9/04* (2006.01)
*F02N 11/04* (2006.01)
*F02N 17/00* (2006.01)
*H02K 23/52* (2006.01)

(52) U.S. Cl. .................. 290/40 R; 290/43; 322/10; 123/179.3

(58) Field of Classification Search .......... 290/40 R, 290/43; 322/10; 123/179.3
See application file for complete search history.

(56) References Cited

U.S. PATENT DOCUMENTS

| | | | | |
|---|---|---|---|---|
| 2,153,856 A | * | 4/1939 | Weydell ........................ 475/13 |
| 2,930,259 A | * | 3/1960 | Riedel .......................... 475/13 |
| 4,346,773 A | * | 8/1982 | Hofbauer et al. ............ 180/165 |
| 4,525,151 A | * | 6/1985 | Tomita et al. ............... 474/101 |
| 4,558,417 A | * | 12/1985 | Akiyama et al. ............ 701/114 |
| 4,758,208 A | * | 7/1988 | Bartos et al. ................ 474/135 |
| 4,809,199 A | * | 2/1989 | Burgess et al. ............. 340/5.21 |
| 4,826,467 A | * | 5/1989 | Reese et al. ................... 474/14 |
| 4,858,585 A | * | 8/1989 | Remmers ..................... 123/335 |
| 4,981,116 A | * | 1/1991 | Trinquard ................. 123/90.31 |
| 5,101,780 A | * | 4/1992 | Jones ........................ 123/182.1 |
| 5,132,604 A | * | 7/1992 | Shimane et al. ............... 322/10 |
| 5,144,300 A | * | 9/1992 | Kanno .......................... 340/984 |
| 5,219,397 A | * | 6/1993 | Jones ....................... 123/179.3 |
| 5,345,910 A | * | 9/1994 | Remmers et al. ....... 123/406.53 |
| 5,403,240 A | * | 4/1995 | Smith et al. .................... 474/8 |
| 5,441,122 A | * | 8/1995 | Yoshida ..................... 180/65.2 |
| 5,495,127 A | * | 2/1996 | Aota et al. ..................... 290/31 |
| 5,543,703 A | * | 8/1996 | Kusase et al. ................ 322/16 |
| 5,653,208 A | * | 8/1997 | Nakamura ............. 123/406.52 |
| 5,713,320 A | * | 2/1998 | Pfaff et al. ................ 123/179.3 |
| 6,024,065 A | * | 2/2000 | Hojna et al. ............. 123/179.3 |
| 6,032,632 A | * | 3/2000 | Bolenz et al. ........... 123/179.3 |
| 6,202,776 B1 | | 3/2001 | Masberg et al. |
| 6,274,943 B1 | * | 8/2001 | Hasegawa et al. ........ 290/40 C |
| 6,363,899 B1 | * | 4/2002 | Koelle et al. ............ 123/179.3 |
| 6,418,899 B1 | * | 7/2002 | Bluemel et al. .......... 123/179.3 |
| 6,481,404 B1 | * | 11/2002 | Perry et al. ............... 123/179.3 |
| 6,506,137 B2 | * | 1/2003 | Guhr ........................... 474/135 |

(Continued)

FOREIGN PATENT DOCUMENTS

JP    2005048821 A * 2/2005

(Continued)

*Primary Examiner*—Tran Nguyen
*Assistant Examiner*—Pedro J. Cuevas
(74) *Attorney, Agent, or Firm*—Brooks Kushman P.C.; Carlos Hanze

(57) ABSTRACT

A method for controlling an engine and a belt-driven integrated starter (B-ISG) connected to the engine. The method includes determining engine running indicators and engine stopped indicators. Based on the indicators, the method controls the engine and the B-ISG for coordinating engine stops and starts with a capability of the B-ISG to start the engine.

20 Claims, 6 Drawing Sheets

U.S. PATENT DOCUMENTS

| | | | |
|---|---|---|---|
| 6,511,393 B1 * | 1/2003 | Bogl et al. | 474/101 |
| 6,609,989 B2 * | 8/2003 | Bogner et al. | 474/134 |
| 6,648,783 B1 * | 11/2003 | Bogner | 474/134 |
| 6,664,651 B1 * | 12/2003 | Kotre et al. | 290/29 |
| 6,725,821 B2 * | 4/2004 | Warren et al. | 123/179.3 |
| 6,781,252 B2 * | 8/2004 | Berels | 290/43 |
| 6,799,546 B1 * | 10/2004 | Gonring et al. | 123/179.3 |
| 6,817,328 B2 * | 11/2004 | Buglione et al. | 123/179.25 |
| 6,821,223 B2 * | 11/2004 | Henry | 474/134 |
| 6,856,032 B2 * | 2/2005 | Blackburn et al. | 290/40 A |
| 6,857,978 B2 * | 2/2005 | Polster et al. | 474/134 |
| 6,876,097 B2 * | 4/2005 | Thomas et al. | 290/40 A |
| 6,900,552 B2 * | 5/2005 | Fukano et al. | 290/40 C |
| 6,909,201 B2 * | 6/2005 | Murty et al. | 307/10.1 |

FOREIGN PATENT DOCUMENTS

| | | | |
|---|---|---|---|
| JP | 2005048822 A | * | 2/2005 |
| JP | 2005069139 A | * | 3/2005 |

* cited by examiner

METHOD AND SYSTEM FOR CONTROLLING A BELT-DRIVEN INTEGRATED STARTER GENERATOR

BACKGROUND OF INVENTION

1. Field of the Invention

The present invention relates to controlling an engine and a belt-driven integrated starter generator (B-ISG) connected to the engine. Starting and stopping the engine is coordinated to occur when the B-ISG is capable of starting the engine.

2. Background Art

Integrated Starter-Generator (ISG) is an industry term for the electric machine used in Hybrid Electric Vehicles (HEVs). This term does not indicate the power level of the machine or the method of connection to the ICE, only that it is a single machine functioning both as a starter and a generator. Some publications use Combined Starter Alternator (CSA) or Combined Alternator Starter (CAS) instead of ISG, but all of these terms describe the same electric machine.

HEV systems and other non-HEV systems are typically designed to maximize fuel economy and reduce emissions. A basic fuel saving strategy, known as start-stop, is to shut the engine off when the vehicle is stopped, then to restart the engine when the driver intends to accelerate. An example of a more advanced and expensive strategy is to have the electric machine provide acceleration torque, which could allow a reduction in the size of the internal combustion engine. ISGs can be used to start the engine.

The method of connecting the ISG to the ICE is identified with a prefix. A Belt-ISG (B-ISG) connects to the engine through pulleys and a belt, while a Crank-ISG (C-ISG) connects directly to the crankshaft. The main benefit of B-ISG over C-ISG is lower cost due to the ability to package the system in an existing product without a major redesign. The main drawback is that the torque available at the engine is limited by belt slip at the pulley and by the belt strength.

SUMMARY OF INVENTION

The present invention overcomes the above-identified deficiencies and relates to controlling an engine and a belt-driven integrated starter generator (B-ISG) connected to the engine. The present invention is particularly advantageous to controlling a B-ISG such that the engine is shut down under conditions when the B-ISG is capable of starting the engine without the belt slipping. In addition, the present invention is advantageous as the B-ISG is a lower cost solution relative to C-ISGs. Further, the start-stop capabilities of the present invention is advantageous to increase fuel economy and reduce emissions.

One aspect of the present invention relates to a method for controlling an engine and a belt-driven integrated starter generator (B-ISG) connected to the engine. The method includes determining engine running indicators and shutting down the engine if the determined engine running indicators signify (i) a desire to stop the engine, and (ii) the B-ISG has sufficient electrical power for cranking the engine. In addition, the method includes determining engine stopped indicators and starting the engine if the determined engine stopped indicators signify (i) a load on the engine is sufficiently low for the B-ISG to start the engine without slipping, and (ii) a desire to start the vehicle.

Another aspect of the present invention relates to a system for implementing a control strategy for controlling a vehicle equipped with an engine and a belt-driven integrated starter generator (B-ISG) connected to the engine. The system for implementing the control strategy includes a control module adapted to control the engine and the B-ISG. The control module includes a memory in electrical communication with inputs and outputs of the control module. The control module delivers signals to the outputs for controlling the engine and the B-ISG. In addition, the system includes a plurality of sensors that deliver electrical signals to the inputs of the control module for determining engine running indicators and engine stopped indicators. Instructions stored in the memory execute the control strategy. The control strategy starts the engine if the determined engine stopped indicators signify (i) a load on the engine is sufficiently low for the B-ISG to start the engine without slipping, and (ii) a desire to start the vehicle.

Yet another aspect of the present invention relates to a method for determining a state of a vehicle equipped with an engine and a belt-driven integrated starter (B-ISG) connected to the engine. The method, based on the determined state, can control the engine and the B-ISG for increasing fuel economy and reducing emissions by coordinating engine stops and starts with a capability of the B-ISG to start the engine. The method includes determining the following states: a key off state if no key is in an ignition; a power on state if (i) the key off state is determined, and (ii) a key in the ignition is turned to an on position; an enable starter state if (i) the power on state is determined, and (ii) the key in the ignition is turned to an ignition start position; an engine running state if (i) the enable starter state is determined, and (ii) an alternator revolution per minute (ARPM) is greater than or equal to a minimum engine running ARPM; a stopping engine state if (i) the engine running state is determined, (ii) a brake indicator is determined, (iii) a not wheel indicator is determined, (iv) a vehicle speed (VSS) is less than or equal to a minimum stopping state VSS, and (v) the B-ISG is receiving a minimum level of power for turning the crankshaft; a stopped engine state if (i) the stopping engine state is determined, (ii) the VSS is less than a minimum stopped engine VSS, and (iii) the ARPM is less than a minimum stopped engine ARPM; and an enable B-ISG state if (i) the stopped engine state is determined, and (ii) a desired engine start is determined. The stopped engine state indicates the B-ISG is capable of starting the engine without slipping. If the stopping engine state is determined, the engine is controlled to shut down; and if the enable B-ISG state is determined, the engine is controlled to start.

DETAILED DESCRIPTION

Figure 1:
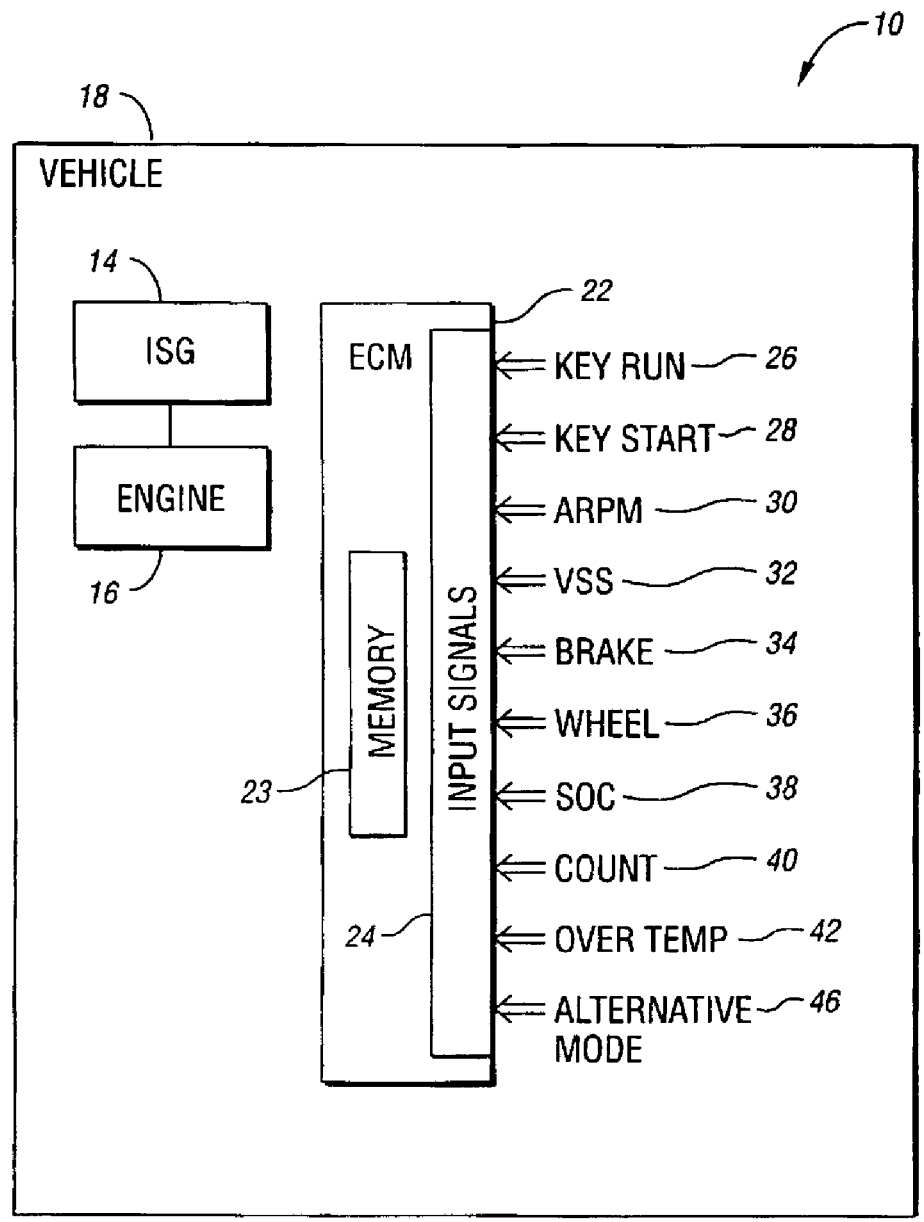
FIG. 1 illustrates a system for implementing a control strategy, in accordance with the present invention.

FIG. 1 illustrates a system 10 for implementing a method in accordance with the present invention. The system 10 is used to implement a method that controls a belt-driven integrated starter generator (B-ISG) 14 connected to an engine 16 of a vehicle 18. In particular, the method shuts down the engine 16 when the vehicle 18 is stopped or about to stop so that stop-start strategies can be used to reduce emissions and fuel consumption.

As the B-ISG 14 is used to turn the crankshaft for starting the stopped engine, the control strategy must determine whether the loads on the engine 16 are low enough for the B-ISG 14 to start the stopped engine 16 without slipping. In addition, as the B-ISG 14 is electrically driven, the control strategy must compensate for the inability of a vehicle to supply electrical power to the B-ISG when not fully charged. To do so, the control strategy must determine whether the B-ISG is receiving power above a minimum level of power for turning the crankshaft before allowing the engine 16 to be shut down.

The system 10 monitors vehicle operating indicators to coordinate engine stops and starts with a capability of the B-ISG 14 to start the engine 16 based on engine running indicators and engine stopped indicators. The system 10 takes measurements of the engine 16 before shutdown and uses these measurements as the engine running indicators. In addition, the system 10 takes measurements of the engine 16 after shutdown and uses these measurements as the engine stopped indicators. As described below, indicators also reflect operating states that can be used to coordinate engine stops and starts.

An electronic control module (ECM) 22 is used to send signals for controlling the engine 16 and the B-ISG 14 for the starts and stops. The ECM 22 is configured to include a memory 23 for executing instructions in response to input signals 24 from a number of sensors used to sense the operating indicators. More particularly, the ECM 22 controls the engine 16 and the B-ISG 14 in accordance with the received input signals 24 and instructions stored on the computer readable medium memory 23.

The operating indicators may include a key indicator 26, a key start indicator 28, an alternator revolutions per minute (ARPM) indicator 30, a vehicle speed (VSS) indicator 32, a brake indicator 34, a wheel indicator 36, a state of charge (SOC) indicator 38, a count indicator 40, an B-ISG 14 over temperature (over temp) indicator 42, and an alternative control mode indicator 46. It is also within the scope and contemplation of the present invention to calculate some of the input signals instead of using measurements, such as calculating ARPM based on engine speed.

Figure 2:
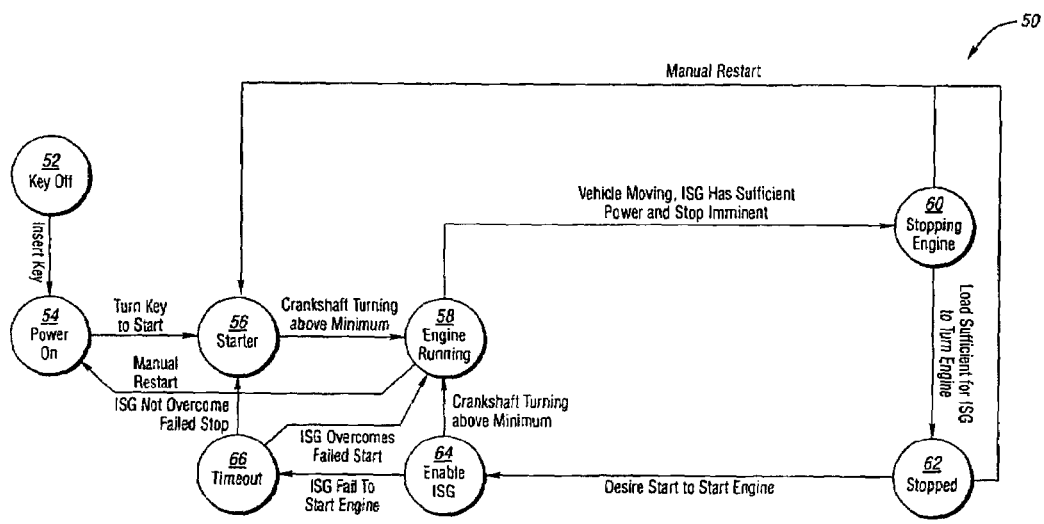
FIG. 2 illustrates a method for controlling a belt-driven integrated starter generator, in accordance with the present invention.

FIG. 2 illustrates a system 50 according to one aspect of the present invention for determining whether a vehicle stop is imminent and whether the B-ISG 14 is capable of starting the engine 16 without slipping if the engine 16 is shut down.

System 50 begins in a key off state 52. The key off state 52 is determined if a driver has yet to insert a key into the ignition. A power-on state 54 is determined once the key is inserted and the key indicator 26 determines the key is turned to an on position. Once the power is on, starter state 56 is determined as soon as the key start indicator 28 shows that the key was turned from the power-on position to an engine start position. The engine start position prompts a starter or the B-ISG 14 to turn the crankshaft for starting the engine 16.

As the crankshaft turns, an engine running state 58 is determined if the ARPM indicator 30 indicates the crankshaft is turning at a speed that is greater than or equal to a minimum ARPM. The engine running operating state 58 indicates the engine 16 is running at a speed that is capable of moving the vehicle 18 once the wheels are connected to the engine. Once the wheels are connected to the engine, the wheels begin to turn and the vehicle 18 moves. The system 50 then monitors operation so the engine 16 can be shut down and started for decreasing emissions.

The engine 16 is shut down in stopping engine state 60. The stopping engine state 60 can be determined anytime the B-ISG 14 has sufficient electrical power to turn the crankshaft. Stopping engine state 60 controls the engine 16 to shut down, if:

(i) the brake indicator 34 indicates the actuation of a brake pedal;

(ii) the wheel indicator 36 indicates the wheels are not connected to and turned by the engine 16, not necessary if using a High Power C-ISG;

(iii) the VSS indicator 34 indicates the vehicle speed is less than a minimum VSS; and (iv) the SOC indicator 38 indicates that there is sufficient electrical power for the B-ISG to turn the crankshaft.

Once the engine 16 is shut down, it is ready to be started but the B-ISG 14 is prevented from attempting to start the engine 16 until a stopped state 62 is determined. The stopped state 62 only allows the B-ISG 14 to attempt to start the engine 16 when the loads on the crankshaft are low enough for the B-ISG 14 to turn the crankshaft without slipping. The stopped state 62 is determined after stopping engine state 60 if:

(i) the VSS indicator 32 indicates the speed of the vehicle is less than a minimum VSS; and (ii) the ARPM indicator 30 indicates the crankshaft is turning at a speed that is less than a minimum ARPM.

From either the stopping engine state 60 or the stopped engine state 62, the starter state 56 is returned to and determined if the key indicator 26 indicates the key was turned to the engine start position. The return to the starter state 56 ensures that the program tracks a possible scenario where the driver initiates the starter motor by engaging the key start indicator 28, such as when the operator attempts a manual restart when engine stalls.

After the stopped engine state 62 determines the B-ISG 14 is capable of starting the engine 16, an enable B-ISG state 64 initiates turning of the crankshaft in response to a desire to start the engine 16. A desire to start the engine occurs if:

(i) the brake indicator 34 indicates the release of previously actuated brake pedal; and (ii) the wheel indicator 36 indicates the wheels are not connected to the engine.

In addition, for a manually shifted vehicle, the driver can indicate a desire to start the engine 16 by shifting into gear from neutral while actuating both the brake pedal and the clutch pedal.

Still further, any type of car could include a switch that can indicate a desire to start the engine 16. Finally, for a vehicle with an automatic transmission, the desire to start could simply occur from the driver actuating a gas pedal.

From the enable B-ISG state 64, the engine running state 58 is determined if the ARPM indicator 30 indicates the ARPM is greater than a minimum ARPM. Once the vehicle is moving again, system 50 again determines whether a stop is imminent and whether the B-ISG 14 is capable of starting the engine 16.

If for some unexpected reason the B-ISG fails to start the engine 16 within a predetermined time period after determining the enable B-ISG state 64, the engine has either stalled or stopped. For this reason, a timeout state 66 is determined if the count indicator 40 indicates the count delay is greater than a timeout value. If the engine running operating state 58 is not determined after reaching the timeout operating state 66, then it is assumed the engine 16 needs to be manually started and starter state 56 is returned to. If on the other hand, the B-ISG 14 overcomes the failed start, which can occur if the B-ISG 14 is simply late in achieving the minimum ARPM, then the engine running operating state 58 can still occur without a manual start.

Figure 3:
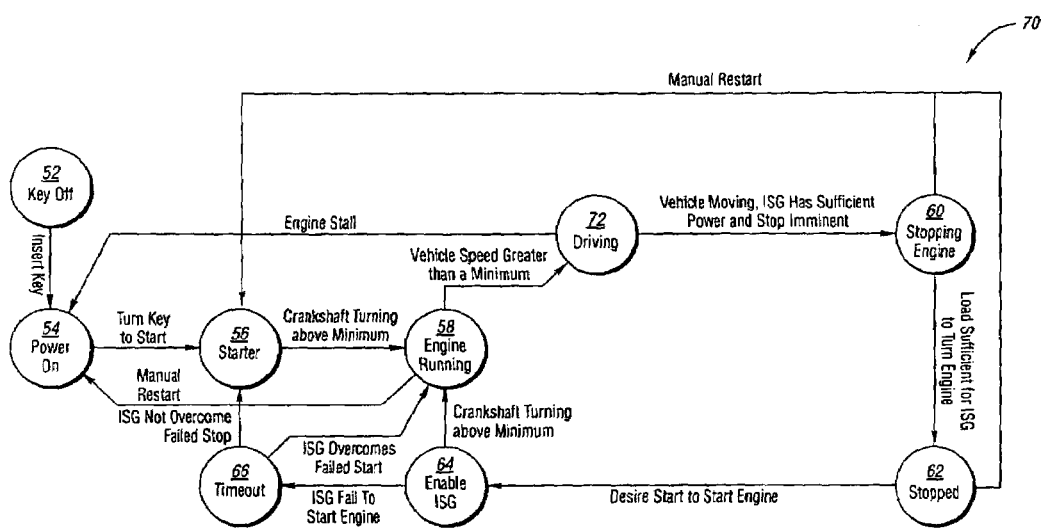
FIG. 3 illustrates the method of controlling the belt-driven integrated starter generator further comprising a driving state, in accordance with the present invention.

FIG. 3 illustrates a method 70 according to one aspect of the present invention that further includes determining an engine driving operating state 72 before deciding whether a vehicle stop is imminent and whether the B-ISG 14 is capable of starting the engine 16. Method 70 is especially suited for preventing inadvertent shutdowns that can commonly occur when starting a vehicle in a parking lot.

In a parking lot, the vehicle tends to travel at a low rate of speed while performing numerous stops and starts. The slow speed coupled with the stops and starts can fool the ECM 22 into believing a stop is imminent even though the vehicle 18 is merely trying to navigate through the parking lot.

To prevent the false stops, the vehicle 18 must pass from the engine running state 58 to the driving operating state 72 before the stopping engine state 60 is determined. The driving operating state 72 protects against the engine 16 shutting down unless the vehicle 18 is operating outside of the parking lot by requiring the vehicle to reach a vehicle speed that is greater than the speed one usually travels at in a parking lot, typically within the range of 5 to 15 mph, and usually 8 mph.

The driving operating state 72 is determined from the engine running state 58 if the VSS indicator 32 indicates the vehicle speed is greater than a minimum vehicle speed. The vehicle 18 is presumed to be operating outside the parking lot at speeds above the minimum vehicle speed. The remaining portions of the system 70 operate in a fashion similar to the system 50 described above and the states having common reference designations and criterion operate in the same manner. In addition, from driving state 72, power on state 54 is determined if the engine 16 stalls.

Figure 4:
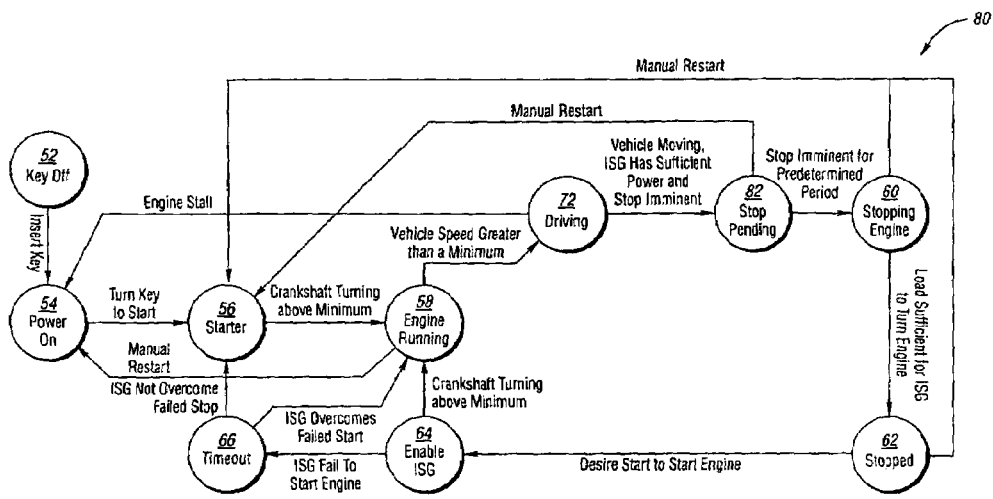
FIG. 4 illustrates the method for controlling the belt-driven integrated starter generator further comprising a stop pending state, in accordance with the present invention.

FIG. 4 illustrates a method 80 according to one aspect of the present invention that further includes determining a stop pending operations state 82 before deciding whether a vehicle stop is imminent and whether the B-ISG 14 is capable of starting the engine 16. The stop pending operating state 82 is included for preventing the engine 16 from shutting down before the stop is pending for a period of time. The stop pending state 82 helps when the indicators show the vehicle is about to stop, but in reality the indicators, while proper, do not actually reflect the intent of the driver. For example, when the driver operates the vehicle 18 with the intent to conduct a rolling stop, the vehicle 18 is almost completely stopped but the driver does not intend to completely stop the vehicle 18. Rather, the driver desires immediate acceleration, which could not occur if the engine 16 were shut down.

To allow rolling stops, the vehicle 18 must pass from the driving state 72 to a stop pending state 82 before the stopping engine state 60 is determined. The stop pending state 82 prevents automatically shutting down the engine 16 for a predetermined period of time that is preferably long enough to allow the driver to conduct a rolling stop without the engine 16 shutting down. The stop pending state 82 is determined from the driving state 72 if:

(i) the brake indicator 34 indicates the brake pedal is actuated;
(ii) the wheel indicator 36 indicates the wheels are not connected to and turned by the engine 16;
(iii) the VSS indicator 32 indicates the vehicle speed is less than a minimum vehicle speed; and
(iv) the SOC indicator 38 indicates that there is sufficient electrical power for the B-ISG to turn the crankshaft.

To pass through stop pending state 82 and onto stopping engine state 60, the count indicator 40 counts a sufficient number of units to satisfy a delay timeout value from the time the stop pending state 82 was determined. In other words, the stop must be imminent for a predetermined period of time before the stopping engine state 60 is determined and the engine 16 is shut down. In the event the delay timeout value is not surpassed, the driving state 72 is returned to.

Figure 5:
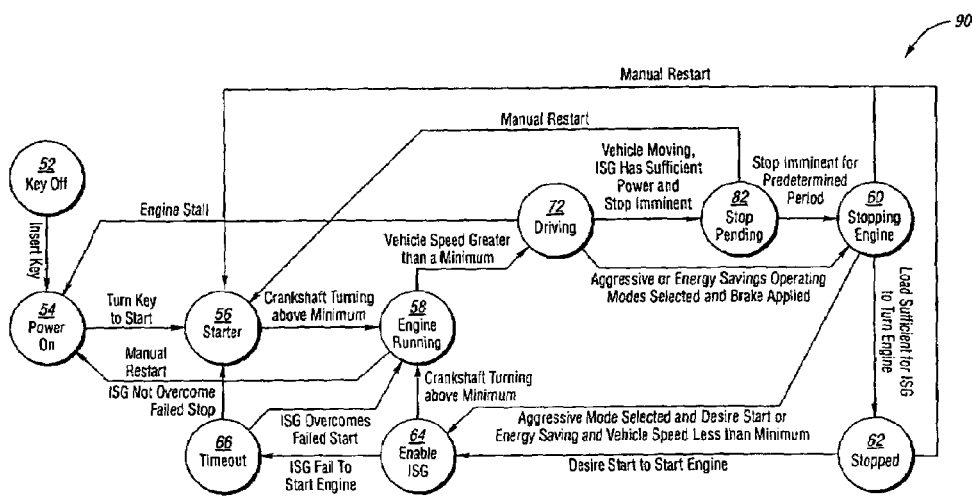
FIG. 5 illustrates a method for controlling the belt-driven integrated starter generator further comprising an alternative control strategy, in accordance with the present invention.

FIG. 5 illustrates a method 90 according to one aspect of the present invention that further includes determining an alternative control indicator 46 that reflects selection of an energy saving operating mode, an aggressive operating mode, or both.

The alternative controls can be used for specific performance criteria. In the energy saving mode, it is desirable to skip the stop pending state 82 for quicker shutdown and to skip the stopped state 62 for using the vehicle's energy to turn the crankshaft. In the aggressive operations mode, it is desirable to skip the stop pending state 82 and quickly shut down the engine 16 and to skip the stopped engine state 62 for quickly starting the engine 16.

In method 90, stopping engine state 60 is determined from the driving operating state 72 and stop pending operating state 82 is bypassed if:
(i) the alternative control indicator 46 indicates aggressive made or energy saving mode is determined;
(ii) the VSS indicator 32 indicates the vehicle speed is greater than a minimum VSS; and
(iii) the brake indicator 34 indicates the brake is actuated.

In addition, with reference to aggressive mode and energy savings made, the stopped engine state 62 is skipped and an immediate attempt is made to start the engine by determining the enable B-ISG state 64 if:
(i) the alternative control indicator 46 indicates aggressive mode or energy savings mode;
(ii) if energy savings mode is selected, the VSS indicator 32 indicates the vehicle speed is less than the minimum VSS;
(iii) if aggressive mode is selected, the wheel indicator 36 indicates the wheels are not connected to and turned by the engine 16;
(iv) if aggressive mode is selected, a desire to start engine; and
(v) if aggressive mode is selected, the brake is not applied.

Figure 6:
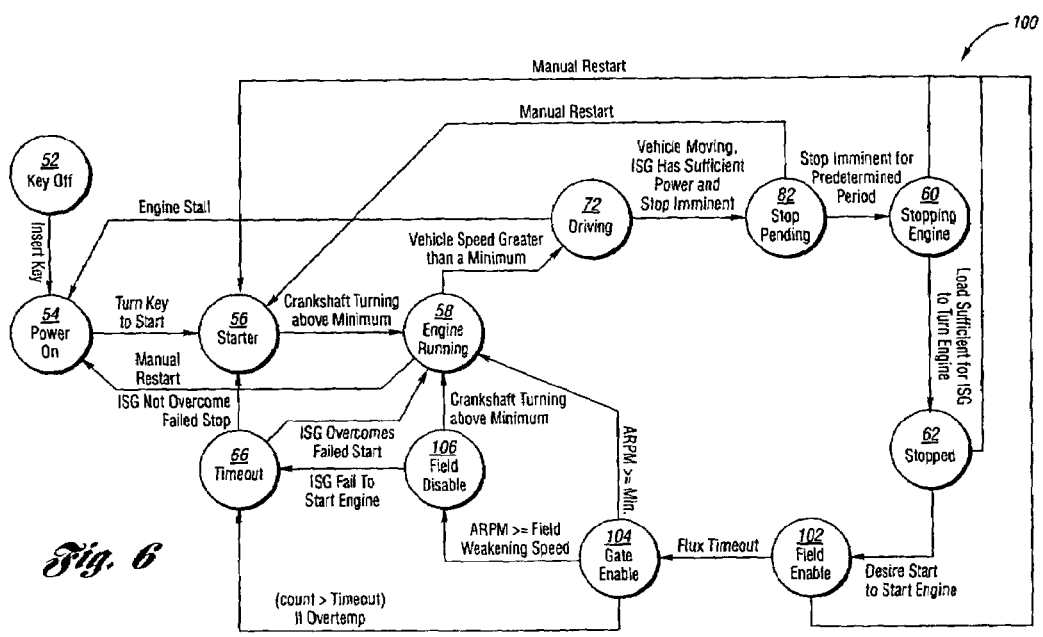
FIG. 6 illustrates a method for controlling a belt-driven integrated starter generator having a Lundell machine, in accordance with the present invention.

FIG. 6 illustrates a method 100 for use with a Lundell type B-ISG 14 for determining engine operating indicators and using the determined operating indicators for deciding whether a vehicle stop is imminent and whether the B-ISG 14 is capable of starting the engine 16.

Prior to rotating the crankshaft, a field enable state 102 is determined if a desired engine start signal, as described above, is communicated. The field enable state 102 turns on the field excitation for the Lundell B-ISG 14. After a flux timeout period elapses, gate enable state 104 is determined and the Lundell machine is generating sufficient flux to turn the crankshaft. From the gate enable state 104, a field disable state 106 is determined if the field should be turned off. The field is typically turned off once the ARPM has reached its maximum at a field weakening threshold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the use of the indicators could similarly be substituted for other indicators not mentioned herewith that would also work in determining the described states.

What is claimed is:

1. A method for controlling an engine and a belt-driven integrated starter generator (B-ISG) connected to the engine, the method comprising:
   determining engine running indicators;
   shutting down the engine if the determined engine running indicators signify (i) a desire to stop the engine, and (ii) the B-ISG has sufficient electrical power for cranking the engine;
   determining engine stopped indicators; and
   starting the engine with the assistance of the B-ISG if the determined engine stopped indicators signify (i) a load on the engine is sufficiently low for the B-ISG to start the engine without slipping, and (ii) a desire to start the engine.

2. The method of claim 1, wherein shutting down the engine further comprises monitoring for a predetermined period of time the desire to stop the engine.

3. The method of claim 2, wherein the predetermined period of time is sufficient for conducting a rolling stop.

4. The method of claim 1, wherein shutting down the engine further comprises determining an alternative control strategy and shutting down the engine based on the alternative control strategy, wherein the alternative control strategy is one or both of an energy savings mode and an aggressive operating mode.

5. The method of claim 1, wherein one of the determined engine running indicators is a vehicle speed, and shutting down the engine further comprises determining whether the vehicle speed is greater than a minimum vehicle speed.

6. The method of claim 1, further comprising determining a manual restart indicator for automatically starting the engine.

7. The method of claim 1, further comprising determining the engine running if the determined stopped indicators signify (i) the desire to start the engine and (ii) a crankshaft of the engine turning above a minimum speed, wherein the engine can be shut down again after determining the engine running.

8. A system for implementing a control strategy for controlling a vehicle equipped with an engine and a belt-driven integrated starter generator (B-ISG) connected to the engine, the system comprising:
   a control module adapted to control the engine and the B-ISG, the control module having a memory in electrical communication with inputs and outputs of the control module, the control module delivering signals to the outputs for controlling the engine and the B-ISG;
   a plurality of sensors for determining engine running indicators and engine stopped indicators, the sensors delivering electrical signals to the inputs of the control module; and
   instructions stored in the memory for executing the control strategy, the control strategy comprising starting the engine with the assistance of the B-ISG if the determined engine stopped indicators signify (i) a load on the engine is sufficiently low for the B-ISG to start the engine without slipping, and (ii) a desire to start the engine.

9. The system of claim 8, wherein the control strategy includes instructions for shutting down the engine if the determined engine running indicators signify (i) a desire to stop the engine, and (ii) the B-ISG has sufficient electrical power to start the engine.

10. The system of claim 9, wherein shutting down the engine further comprises determining for a predetermined period of time the desire to stop the engine.

11. The system of claim 10, wherein the predetermined period of time is sufficient for conducting a rolling stop.

12. The system of claim 9, wherein one of the determined engine running indicators is a vehicle speed, and shutting down the engine further comprises determining the vehicle speed is greater than a minimum vehicle speed.

13. The system of claim 9, wherein shutting down the engine further comprises determining an alternative control strategy and shutting down the engine based on determining the alternative control strategy, wherein the alternative control strategy is one or both of an energy savings mode and an aggressive operating mode.

14. The system of claim 8, wherein the control strategy includes instructions for determining a manual restart indicator for automatically starting the engine.

15. The system of claim 8, wherein the control strategy includes instructions for determining the engine running if the determined stop indicators signify (i) the desire to start the engine, and (ii) a crankshaft of the engine turning above a minimum speed, wherein the engine can be shut down again after determining the engine running.

16. A method for determining a state of a vehicle equipped with an engine and a belt-driven integrated starter (B-ISG) connected to the engine and based on the determined state controlling the engine and the B-ISG for increasing fuel economy and reducing emissions by coordinating engine stops and starts with a capability of the B-ISG to start the engine, the method comprising:
   determining a key off state if no key is in an ignition;
   determining a power on state if (i) the key off state is determined, and (ii) a key in the ignition is turned to an on position;
   determining an enable starter state if (i) the power on state is determined, and (ii) the key in the ignition is turned to an ignition start position;
   determining an engine running state if (i) the enable starter state is determined, and (ii) an alternator revolution per minute (ARPM) is greater than or equal to a minimum engine running ARPM;
   determining a stopping engine state and controlling the engine to shut down if (i) the engine running state is determined, (ii) a brake indicator is determined, (iii) a not wheel indicator is determined, (iv) a vehicle speed (VSS) is less than or equal to a minimum stopping state VSS, and (v) a state of charge (SOC) of the B-ISG indicates the B-ISG has sufficient electrical power for turning the crankshaft;
   determining a stopped engine state if (i) the stopping engine state is determined, (ii) the VSS is less than a minimum stopped engine VSS, and (iii) the ARPM is less than a minimum stopped engine ARPM, wherein the stopped engine state indicates the B-ISG is capable of starting the engine without slipping; and determining an enable B-ISG state and controlling the engine to start with the assistance of the B-ISG if (i) the stopped engine state is determined and (ii) a desire engine start is determined.

17. The method of claim 16, further comprising determining a manual restart indicator for automatically starting the engine.

18. The method of claim 16, wherein the engine is shut down only after the stopping engine state is determined for a predetermined period of time sufficient for conducting a rolling stop.

19. The method of claim 16, wherein the stopping engine state is determined after (i) the engine running state is determined, and (ii) a minimum driving speed is determined.

20. The method of claim 16, wherein shutting down the engine further comprises determining an alternative control strategy and shutting down the engine based on the alternative control strategy, wherein the alternative control strategy is one or both of an energy savings mode and an aggressive operating mode.

* * * * *